April 15, 1930.  G. E. EDMUNDS  1,754,744
JOURNAL BOX MOUNTING
Filed April 29, 1929   2 Sheets-Sheet 1
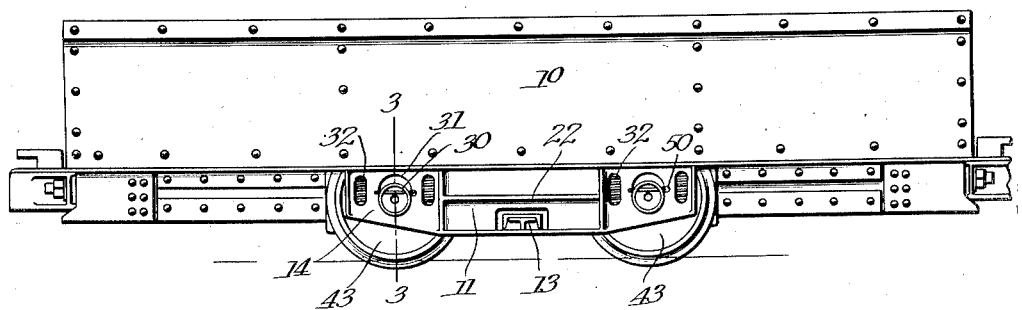
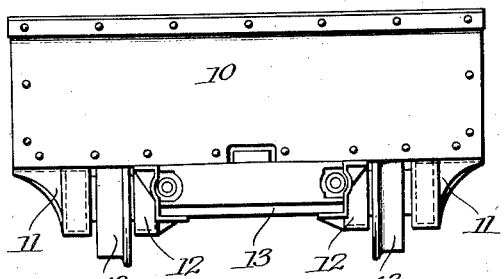
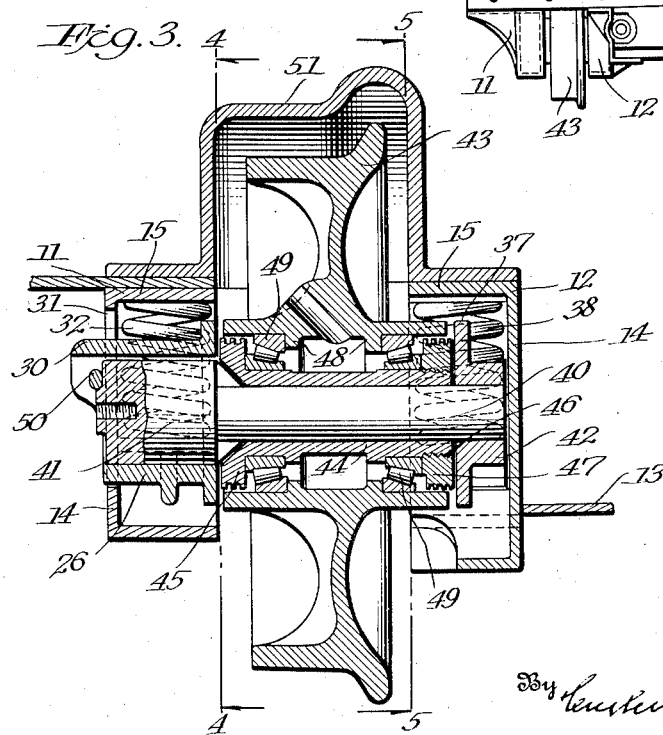
Inventor
Glenn E. Edmunds,
By Lenihan, Bryant & Darby
Attorneys April 15, 1930. G. E. EDMUNDS 1,754,744
JOURNAL BOX MOUNTING
Filed April 29, 1929 2 Sheets-Sheet 2
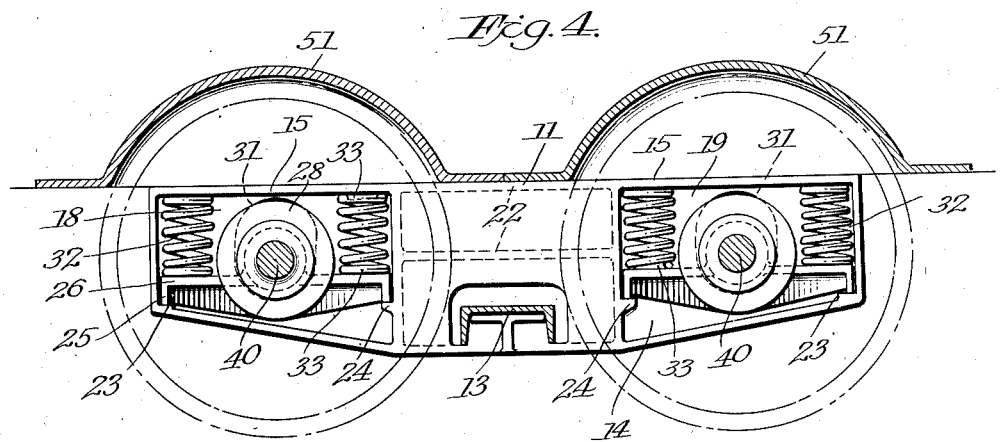
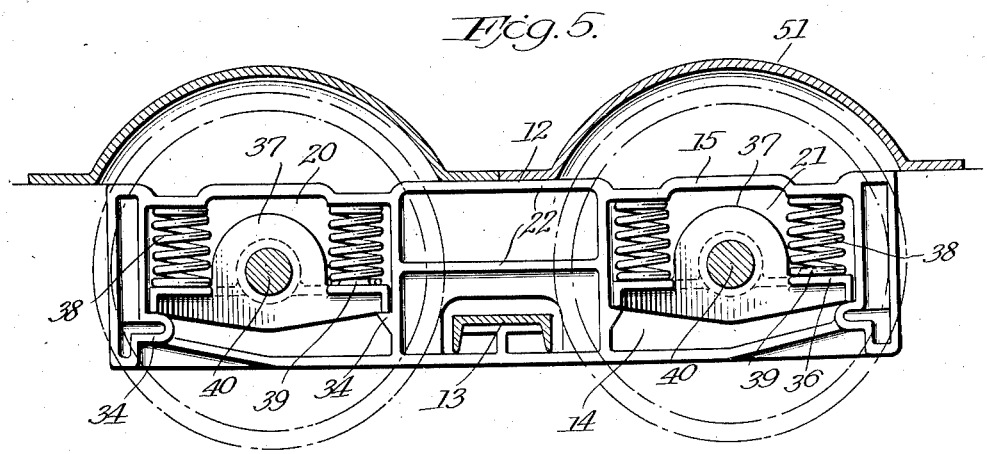
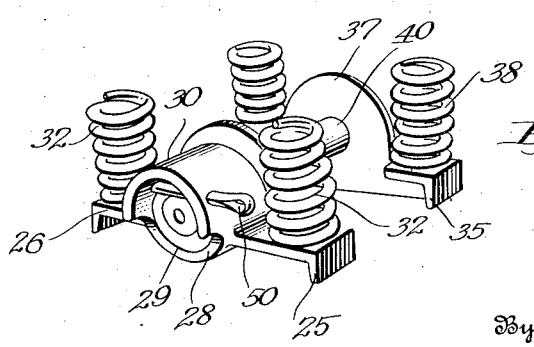
Inventor
Glenn E. Edmunds Patented Apr. 15, 1930

1,754,744

UNITED STATES PATENT OFFICE

GLENN E. EDMUNDS, OF FRANKLIN, OHIO, ASSIGNOR TO THE BONNEY-FLOYD COMPANY, OF COLUMBUS, OHIO, A CORPORATION OF OHIO

JOURNAL-BOX MOUNTING

Application filed April 29, 1929. Serial No. 359,050.

The present invention relates to car trucks of the stub axle type for use in mines and industrial plants and more especially to improved means for maintaining journal boxes in the side frames or sill bars of the car.

An important object of the invention is to provide simple and efficient means for mounting the journal boxes of stub axles in double frames.

A further object comprehends the provision of means for yieldably maintaining the journal boxes in proper position in the side frames so that the wheel and axle may follow the irregularities of the track or ground over which the wheel travels, without materially affecting the position of the car body.

Another object is to provide absorbing means for reducing the shock normally imparted to the side frames of a mine car when the wheels thereof are subjected to heavy impacts or the like.

Another object consists in providing side frames or sill bars in which the journal boxes are inserted in position from the inside or wheel side of the frames so that when the parts are set up, the outer sides of the frames will act as a closure for the journal boxes and springs and thus prevent their removal from the frames.

A still further object consists in mounting the journal boxes and stub axles on the side frames so that the horizontal axis of the axle will be offset relative to the supporting arms of the journal boxes in order that the shock absorbing springs confined between the supporting arms and the upper surface of the side frames will tend to relieve or absorb any heavy impacts imparted to the wheels and which ordinarily would be directly transferred to the side frames and truck body.

Other objects and advantages of the invention will become apparent from the following description when taken in conjunction with the accompanying claims and drawings.

Referring to the drawings in which is shown a preferred embodiment of the invention:

Figure 1 is a side view of a mine car showing the invention applied thereto.
Figure 2 is an end view of Figure 1.

Figure 3 is a sectional view taken substantially along the line 3—3 of Figure 1.

Figure 4 is a sectional view taken substantially along the line 4—4 of Figure 3 looking in the direction of the arrows.

Figure 5 is a sectional view taken substantially along the line 5—5 of Figure 3 looking in the direction of the arrows.

Figure 6 is a detail perspective view of the journal boxes and their associated parts.

Referring to the drawings in which like numerals indicate like parts in the several views, 10 denotes a mining car or truck body, to the underside of which may be secured two pairs of side frames or sill bars, each of which pairs comprises outer side frame members 11 and inner side frame members 12 (Figure 2) connected by the cross girts 13.

Each of the side frames 11 and 12 is formed with closed outer side portions 14 which terminate in inwardly extending flanges 15 so as to provide adjacent each end of the side frames, pockets 18, 19, 20 and 21.

The pockets 18 and 19 which are formed in the outside frames 11 are longitudinally spaced from each other by the webs 22 and each has formed therein a pair of seats or stops 23 and 24 on which may be removably mounted the depending fingers 25 of the lateral arms 26 of the journal box 28. Each of the journal boxes 28 has a transverse enlarged bearing 29 that is provided with a laterally extending skirt or cover 30 which extends through an elongated opening 31 formed in the outer closed portion 14 of the side frame 11. A coil spring 32 confined between each of the arms 26 and the upper surface of the flanges 15 of the side frames 11 is preferably maintained in position by vertically aligned shoulders 33 carried by the arms 25 and the flanges 15 respectively.

The pockets 20 and 21 of the inside frames 12 are substantially similar in construction to the pockets 18 and 19 and have the stops or seats 34 which receive the depending fingers 35 of the arms 36 of the journal box 37. Coil springs 38 confined between the arms 36 and the adjacent upper surface of the flanges 15 of the frame 12 coact with the springs 32 for maintaining the journal boxes 30 and 37 normally in engagement with their seats. The ends of the springs 38 may be maintained in position by the shoulders 39 formed on the opposed surfaces of the arms 36 and the flanges 15. The pockets 20 and 21 are spaced from each other by the webs 22', while the outer or end stops 34 (Fig. 5) may be formed by offset or bent portions of the side frame castings.

A stub axle 40 is preferably provided with an enlarged outer end portion 41 which extends into the skirt or cover 30 and projects slightly beyond the outer face 14 of the side frame 11, while the opposite reduced end of the axle 40 fits within a bearing or flange 42 arranged within the side frame 12. A wheel 43 is suitably mounted on the shaft 40 and, as shown in Figure 3, this mounting may be similar to the construction set forth in my Patent 1,708,608, dated April 9, 1929, and essentially comprises a sleeve 44 having an enlarged grooved head 45 and a reduced threaded end 46 to which is connected a removable collar 47 of substantially the same diameter as the enlarged head 45. The hub of the wheel 43 has spaced annular shoulders 48 between which and the enlarged head 45 and collar 47 respectively, are positioned the anti-friction bearings 49. Obviously, the invention may be used with various other types of wheel and axle mountings.

The axle 40 is preferably removably secured in position by a cotter pin 50 which extends transversely through the skirt 30, and is arranged on the outside of the frame 11 so as to not only hold the axle 40 in place, but also acts to retain the journal boxes in their pockets when the wheels and axles are secured to the frames. A cover plate 51 suitably connected to each pair of the frames 11 and 12 extends over the upper portion of the wheels 43 to prevent material carried by the car or foreign matter from reaching the journal boxes and axles.

As clearly indicated in Figures 4 and 5, it will be observed that the horizontal line or axis of the axle 40 is offset or above the arms of the journal boxes and the base line of the springs, so that the springs will relieve the side frames from heavy impacts or shocks to which the wheels are subjected, and which ordinarily would be taken up by the side frames and the car body.

As the outer sides or faces 14 of the side frames 11 and 12 are closed, the journal boxes are inserted in their respective pockets from the inside, that is to say, the wheel side of each frame. After the journal boxes are in position, the springs are forced in their seats under compression so as to impart a slight tension on the journal boxes, and thus yieldably maintain the latter in engagement with their seats.

It will be seen that by reason of the present construction and arrangement of parts, that when the wheel and axle are mounted between the side frames and the cotter pin 50 connected to the skirt 30, the journal boxes and springs will be confined between the closed portions of the frames and the wheel, and thus be prevented from removal therefrom. Moreover, the journal boxes and springs have a full and unlimited action in any direction so as to be capable of taking up or absorbing the excessive shocks or impacts received by the wheels, and which, otherwise, would be transferred to the side frames and car body. The journal boxes have only a limited sliding movement in the pockets, and are so positioned to effectively take up the outside and inside thrusts, as well as the end thrusts to which side frames of trucks or cars of this type are usually subjected.

It is to be understood that the form of the invention herewith shown and described is merely illustrative of a preferred embodiment, and that such changes as fall within the purview of one skilled in the art, may be made without departing from the spirit of the invention and the scope of the appended claims.

I claim:

1. In a mining car, a truck of the independent stub axle type comprising inner and outer side frames, each of said frames having seats therein, a journal box arranged to be removably mounted on said seats, yieldable means for normally urging said journal box into engagement with said seats, a stub axle carried by said journal box, and a wheel mounted on said axle.

2. In a mining car, a truck of the independent stub axle type comprising inner and outer side frames, each of said frames having pockets formed therein, journal boxes, means for supporting said journal boxes within said pockets, yieldable means for normally maintaining the journal boxes in position in said pockets, a stub axle carried by said journal boxes, and a wheel mounted on said axle.

3. In a mining car, a truck of the independent stub axle type comprising inner and outer side frames, each of said frames having a pair of spaced supporting seats adjacent each end thereof, a journal box having a medially disposed transverse bearing and arms extending oppositely from said bearing, said arms arranged to be supported by adjacent pairs of said seats, yieldable means confined between each of the arms and the adjacent portion of the frame for normally maintaining the journal boxes in engagement with said seats, stub axles mounted on said bearings, and wheels carried by said axles.

4. In a mining car, a truck of the independent stub axle type comprising inner and outer side frames, each of said frames being formed with spaced longitudinal pockets having supporting seats therein, a journal box having a medially disposed transverse bearing and arms extending oppositely and laterally from said bearing, said arms arranged to be supported by said seats, a coil spring confined between each of the arms and the adjacent upper surface of the frame, a stub axle carried by each pair of said journal boxes, and a car wheel mounted on said axle.

5. In a mining car, a truck of the independent stub axle type comprising inner and outer side frames, each of said frames having a pair of spaced supporting seats arranged therein, a journal box having a medially disposed transverse bearing and longitudinal arms extending oppositely from said bearing, said arms arranged to be supported by said seats, shock absorbing means confined between each of the arms and the adjacent portion of the frame, said means adapted to normally maintain the arms in engagement with said seats.

6. In a mining car, a truck of the independent stub axle type comprising inner and outer side frames, each of said frames having a pair of spaced supporting seats, a journal box having a medially disposed transverse bearing and horizontal arms extending oppositely from said bearing, said arms arranged to be supported by the adjacent pair of said seats, yieldable means confined between said arms and the upper surface of said frames for normally maintaining the arms in engagement with said seats, a stub axle carried by adjacent pairs of bearings, and a wheel mounted on said axle, the horizontal axis of the axle being offset relative to the horizontal plane of said arms.

7. In a mining car, a truck of the independent stub axle type comprising inner and outer side frames, each of said frames having a pair of spaced supporting seats, a journal box having a medially disposed transverse bearing and arms extending oppositely from said bearing, said arms adapted to engage said seats, shock absorbing means confined between each of the arms and the adjacent portion of the frame, a stub axle mounted in each pair of said bearings, and a wheel carried by said axle, the horizontal axis of said axle being positioned above the horizontal plane of said arms in order to insure the springs absorbing heavy impacts imparted to the wheels.

8. A side frame for mounting the journal boxes of stub axles having a pair of longitudinally spaced seats formed thereon, a journal box mounted on said seats, and yieldable means for normally maintaining the journal boxes in engagement with the seats.

9. A supporting frame for the journal boxes of stub axles comprising spaced pockets, each of said pockets having seats therein, journal boxes mounted on said seats, and shock absorbing means for normally maintaining the journal boxes in engagement with the seats.

10. In a mining car, a truck of the independent loose stub axle type comprising inner and outer side frames, each of said frames having closed outer faces, journal boxes mounted in said frame, yieldable means normally maintaining said boxes in their lowermost position, a stub axle carried by said journal boxes, and a wheel revolubly mounted on said axle, said wheel co-acting with the closed face portions of said frames for maintaining the journal boxes in position.

11. In a mining car, a truck of the independent loose stub axle type comprising inner and outer side frames, journal boxes mounted in said frames, yieldable means normally maintaining said boxes in their lowermost position, a stub axle carried by said journal boxes, a wheel revolubly mounted on said axle, and means permitting the removal of the wheel and axle independently of said journal boxes.

12. In a mining car, a truck of the independent loose stub axle type comprising inner and outer side frames, each of said frames having closed outer faces, journal boxes mounted in said frames, yieldable means normally maintaining said boxes in their lowermost position, a stub axle carried by said journal boxes, a wheel revolubly mounted on said axle, said wheel co-acting with the closed face portions of said frames for maintaining the journal boxes in position, and means permitting the removal of the wheel and axle independently of said journal boxes.

13. A side frame for mounting the journal boxes of loose stub axles comprising a closed outer face and longitudinally spaced pockets, each of said pockets having oppositely disposed seats for supporting the journal boxes thereon.

In testimony whereof I have hereunto set my hand.

GLENN E. EDMUNDS.